United States Patent [19]

Nagle et al.

[11] Patent Number: 5,295,408

[45] Date of Patent: Mar. 22, 1994

[54] ADJUSTABLE CABLE STRAND END FITTING

[75] Inventors: James J. Nagle, Birmingham; David A. Van Zanten, Clawson, both of Mich.

[73] Assignee: Nagle Industries, Inc., Clawson, Mich.

[21] Appl. No.: 959,075

[22] Filed: Oct. 9, 1992

[51] Int. Cl.⁵ ............................................. F16C 1/22
[52] U.S. Cl. ............................. 74/502.6; 74/501.5 R
[58] Field of Search ............ 74/501.5 R, 502.4, 502.6

[56] References Cited

U.S. PATENT DOCUMENTS

| | | | |
|---|---|---|---|
| 3,710,645 | 1/1973 | Bennett | 74/502.4 |
| 3,744,339 | 7/1973 | Martinson | 74/501.5 R |
| 4,007,647 | 2/1977 | Carlson | 74/502.4 |
| 4,023,435 | 5/1977 | LaDue | 74/502.4 |
| 4,177,691 | 12/1979 | Fillmore | 74/501.5 R |
| 4,261,221 | 4/1981 | Kobayashi | 74/501.5 R |
| 4,331,041 | 5/1982 | Bennett | 74/502.4 |
| 4,334,438 | 6/1982 | Mochida | 74/502.4 |
| 4,610,180 | 9/1986 | Spease | 74/501.5 R |
| 4,658,668 | 4/1987 | Stocker | 74/501.5 R |
| 4,669,330 | 6/1987 | Stocker | 74/501.5 R |
| 4,671,445 | 6/1987 | Barker et al. | 74/502.6 X |
| 4,694,706 | 9/1987 | Lichtenberg et al. | 74/501.5 R |
| 4,790,206 | 12/1988 | Thomas | 74/502.4 |
| 4,805,479 | 2/1989 | Brightwell | 74/502.4 |
| 4,829,845 | 5/1989 | Suzuki | 74/502.4 |
| 4,833,937 | 5/1989 | Nagano | 74/501.5 R |
| 4,841,805 | 6/1989 | Italiano | 74/501.5 R |
| 4,841,806 | 6/1989 | Spease | 74/501.5 R |
| 4,854,185 | 8/1989 | Lichtenberg et al. | 74/502.4 X |
| 4,869,123 | 9/1989 | Stocker | 74/501.5 R |
| 4,903,541 | 2/1990 | Shiota | 74/501.5 R |
| 4,936,161 | 6/1990 | Polando | 74/502.6 |
| 5,138,897 | 8/1992 | Beard et al. | 74/502.6 X |
| 5,161,428 | 11/1992 | Petruccello | 74/502.4 |
| 5,174,170 | 12/1992 | Kato et al. | 74/502.4 X |
| 5,178,034 | 1/1993 | Reasoner | 74/501.5 R |
| 5,207,116 | 5/1993 | Sultze | 74/502.4 |

OTHER PUBLICATIONS

3 Sheets of Drawings of an adjustable cable strand end fitting labeled Sheets I through III of Nagle Industries, Inc.

Primary Examiner—Leslie A. Braun
Assistant Examiner—Ryan W. Massey
Attorney, Agent, or Firm—Dinnin & Dunn

[57] ABSTRACT

A strand end fitting includes a housing adapted to be attached to a mounting pin located on a moveable member and having a passageway extending therethrough. The strand end fitting also includes a longitudinal member having an aperture therethrough telescopingly disposed within the passageway whereby a strand extends through the longitudinal member and has a retainer member secured thereon which abuts the longitudinal member. Once the longitudinal member is properly positioned within the housing a locking structure prevents relative movement between the longitudinal member and the housing.

7 Claims, 4 Drawing Sheets

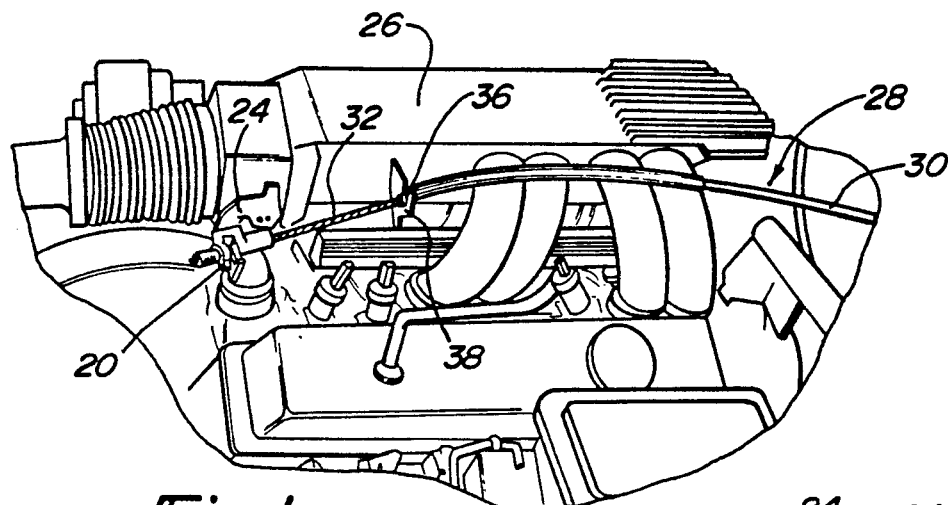
Fig-1
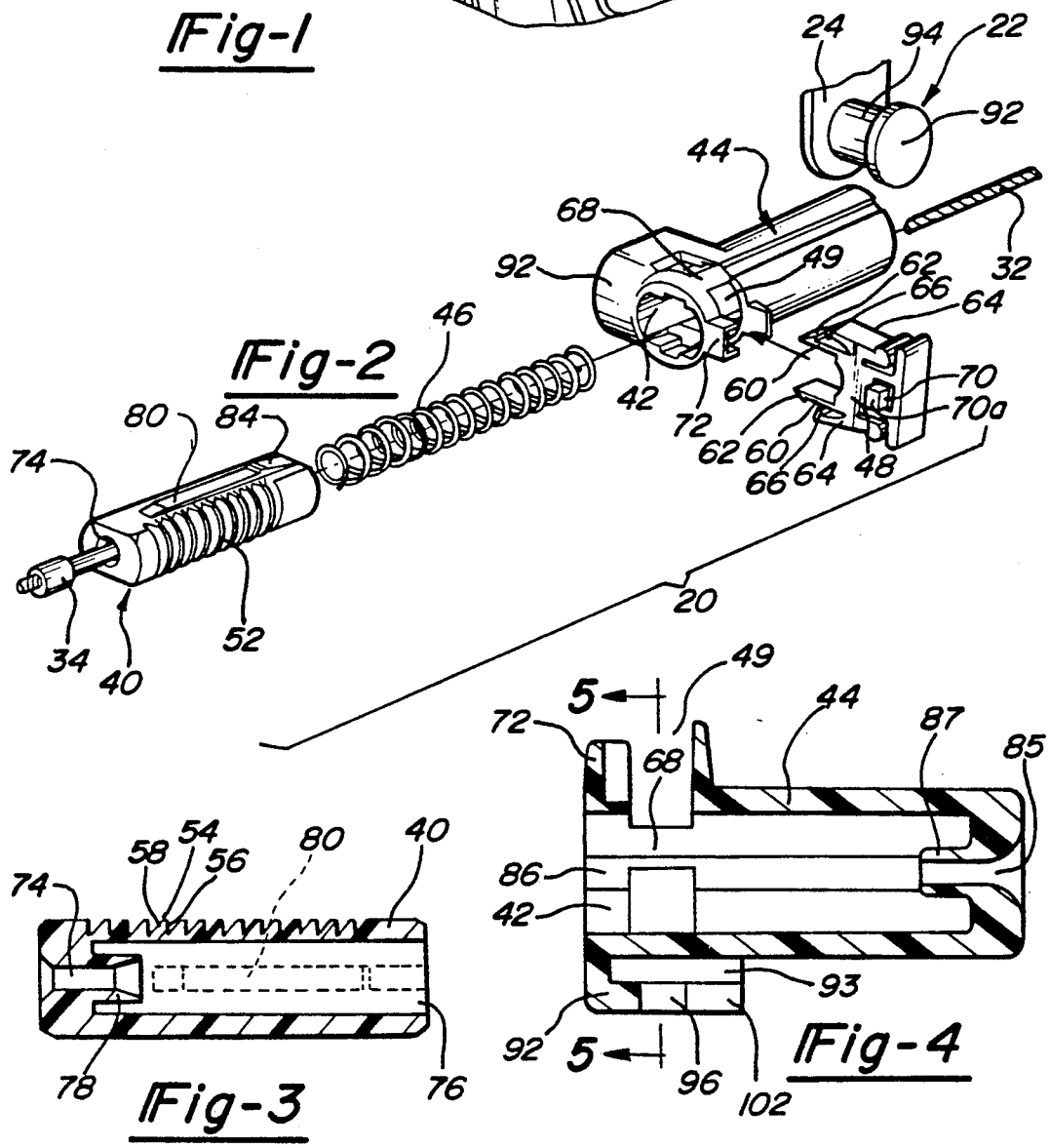
Fig-2
Fig-3
Fig-4

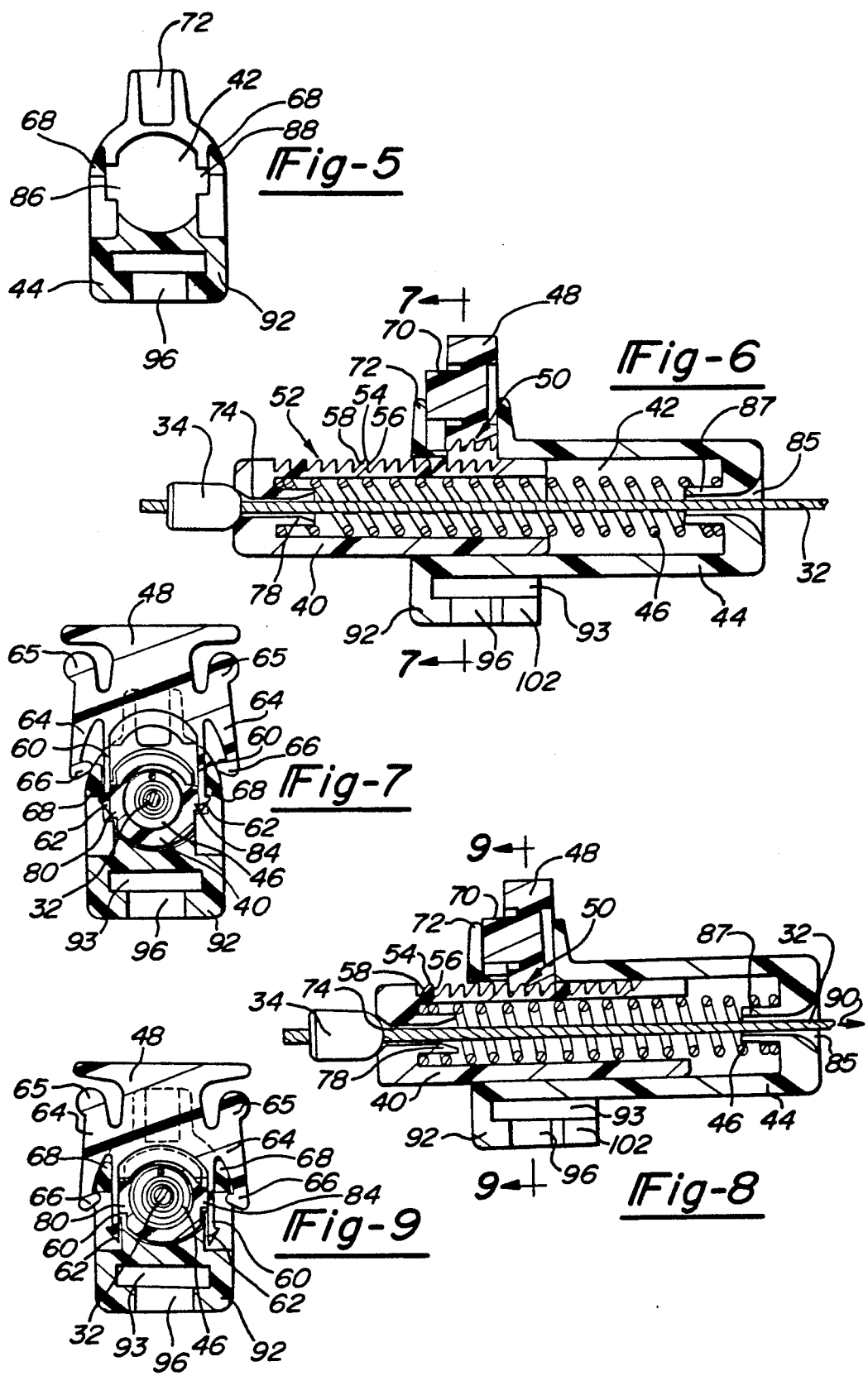

ADJUSTABLE CABLE STRAND END FITTING

BACKGROUND OF THE INVENTION

1. Field of the Invention

The present invention relates generally to cable end fittings and more particularly, to a cable end fitting for adjusting the tension in a cable strand.

2. Description of Related Art

Cable strand end fittings are typically mounted on a mounting post of a carburetor or throttle body of an engine. A strand of a motion control cable extends through the end fitting and has a member staked on one end of the strand to prevent the strand from exiting the end fitting. However, there is no adjustment mechanism on the end fitting to allow the slack or tension in the strand to be varied or adjusted.

Positioning devices have been used in the past to position an end of a conduit for a motion control cable. An example of such a positioning device is disclosed in Fillmore U.S. Pat. No. 4,177,691. This patented positioning device includes an elongated adjustment member attached to the conduit of the motion control cable and having teeth disposed on opposite sides of the adjustment member. The adjustment member extends through a passageway in a support member adapted for attachment to a support structure. The patented positioning device also includes a locking member positioned transversely to the adjustment member which cooperates with the teeth on the adjustment member to prevent movement of the adjustment member relative to the support member. One problem with the above patented device is that the conduit is adjusted and not the strand or cable. An additional probelm is that the support member must be mounted adjacent the end of the conduit and a second member used to connect the cable strand to the mounting post of the carburetor or throttle body.

SUMMARY OF THE INVENTION

It is, therefore, one object of the present invention to provide an adjustable cable strand end fitting.

It is another object of the present invention to provide an adjustable cable strand end fitting enabling the conduit to be easily secured to the engine separate from the adjustable fitting and without the need for a complex mounting arrangement.

It is yet another object of the present invention to provide an adjustable cable strand end fitting which allows the slack or tension in the strand to be varied or adjusted independent of the position of the conduit.

It is a further object of the present invention to provide a cable strand end fitting having position indicators to facilitate proper orientation of the components of the cable strand end fitting.

Briefly summarized, the present invention is a unique cable strand end fitting for use in adjusting the slack or tension in a cable strand attached through the fitting to a throttle body moveable member.

In general, the invention includes a housing having a passageway formed therein and a slot transverse to and communicating with the passageway. A longitudinal member having an aperture therethrough is telescopically disposed within the passageway. An end of the cable strand extends through the aperture and has a retaining member staked to the end. A bias means acting between the housing and the longitudinal member urges the longitudinal member against the retaining member. A locking means positioned in the slot on the housing prevents relative movement between the longitudinal member and the housing. The locking means operable to move between a first, disengaged position and a second, engaged position. A detent means retains the locking means in the respective disengaged and engaged positions.

One advantage of the present invention is that the cable strand end fitting is adjustable. Another advantage of the present invention is that the cable strand end fitting allows the slack or tension in the strand to be adjusted or varied independent of the position of the conduit. Yet another advantage of the present invention is that the end of the conduit may be easily secured to the engine without the need for a complex mounting arrangement. Further advantages of the present invention are position indicators on the individual components of the cable strand end fitting of the present invention to facilitate orientation and assembly of the components.

Other objects, features and advantages of the present invention will become apparent upon reading the following description and accompanying drawings.

BRIEF DESCRIPTION OF THE DRAWINGS

FIG. 1 is a perspective view of an adjustable cable strand end fitting according the present invention illustrated on an engine.

FIG. 2 is an exploded perspective view of the adjustable cable strand end fitting of FIG. 1.

FIG. 3 is a fragmentary view of a longitudinal member of the adjustable strand end fitting of FIG. 2.

FIG. 4 is a fragmentary view of a housing of the adjustable cable end fitting of FIG. 2.

FIG. 5 is a sectional view taken along line 5—5 of FIG. 4.

FIG. 6 is a fragmentary view of the adjustable cable strand end fitting of FIGS. 1 and 2 with a locking clip illustrated in a non-engaged position.

FIG. 7 is a sectional view taken along line 7—7 of FIG. 6.

FIG. 8 is a view similar to FIG. 6 illustrating the locking clip in an engaged position.

FIG. 9 is a sectional view taken along line 9—9 of FIG. 8.

DESCRIPTION OF THE PREFERRED EMBODIMENT(S)

Figure 10:
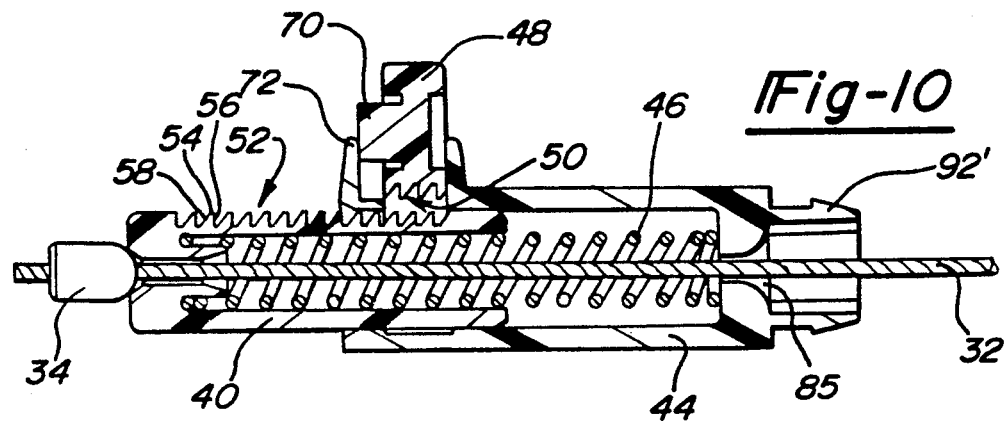
FIG. 10 is a view similar to FIG. 6 of a first alternative embodiment of the adjustable cable strand end fitting of FIGS. 1 and 2.

Referring now to FIG. 1, an adjustable cable strand end fitting 20 according to the present invention as shown. The strand end fitting 20 is adapted to be fixed to a mounting pin 22 located on a mounting member 24 such as a moveable flange on a carburetor or throttle body of an engine 26. The strand end fitting 20 is also adapted to cooperate with a motion control cable 28. The motion control cable 28 has a conduit 30 and a strand 32 slidably disposed within the conduit 30. The strand 32 has one end received by the strand end fitting 20 with a retainer member 34 staked at one end of the strand 32. The other end of the strand 32 is attached to a moveable operator pedal or control mechanism, such as a cruise control servo motor (not shown). The motion control cable 28 includes an attachment member 36 to attach the conduit 30 to a fixed engagement plate or flange 38 on the engine 26. The conduit 30 is fixed to the engagement flange 38 such that the strand 32 moves relative to the engagement flange 38 and conduit 30 such that movement of the strand 32 causes the moveable member 24 on the carburetor or throttle body to move or rotate.

As illustrated in FIG. 2, the strand end fitting 20 includes a longitudinal member, generally indicated at 40, having a passageway therein to receive the strand 32. The longitudinal member is telescopically disposed in a passageway 42 of a housing, generally indicated at 44. A spring 46 positioned within the passageway 42 exerts an outwardly directed force against the longitudinal member 40. It should be appreciated that one end of the strand 32 is fixed, and therefore, the force provided by spring 46 causes engagement between the longitudinal member 40 and the retainer member 34 and exerts a force on the strand 32 to achieve the desired tension or slack in the strand 32. It should be further appreciated that the desired level of tension or slack in the strand 32 may be achieved by varying the spring constant of the spring 46.

The strand end fitting 20 also includes a locking clip 48 disposed in a slot 49 transverse to the passageway 42 and operable for movement between a first, disengaged position and a second, engaged position to prevent movement of the longitudinal member 40 relative to the housing 44. As illustrated in FIG. 6, the locking clip 48 has a plurality of serrations 50 on a surface thereof. The serrations 50 on the locking clip 48 are complementary to a plurality of serrations 52 on the longitudinal member 40. The complementary serrations 50, 52 cooperate when engaged to prevent movement of the longitudinal member 40 relative to the housing 44. It should be appreciated that while the illustrated embodiment discloses a plurality of serrations 50 on the locking clip 48, the locking clip 48 functions satisfactorily when only a single serration is used to prevent relative movement between the longitudinal member 40 and the housing 44. The complementary serrations 50, 52 are made up of a plurality of tooth members 54. Each tooth member 54 includes a planar surface 56 transverse to the longitudinal axis of the longitudinal member 40 and a ratchet surface 58 inclined in one direction and generally transverse to the longitudinal axis of the longitudinal member 40. The tooth members 54 allow movement of the longitudinal member 40 in one direction while preventing movement in the opposite direction.

The locking clip 48 further includes several detent mechanisms to retain and releasably couple the locking clip 48 to the housing 44 when the locking clip 48 is in the first, nonengaged position and to retain the locking clip 48 in the second engaged position. In the illustrated embodiment, the detent mechanism includes a first set of inwardly deflectable resilient fingers 60 having outwardly projecting locking projections 62 on the end of the fingers 60 to releasably couple the locking clip 48 to the housing 44 and a second set of outwardly deflectable resilient fingers 64 having inwardly projecting locking projections 66 to retain the locking clip 48 in the engaged position. Each set of resilient fingers 60, 64 cooperates with a retainer bar 68 of the housing 44 to secure the locking clip 48 to the housing 44.

In the illustrated embodiment, the locking clip 48 includes a tab 70 which performs a two-fold function; one, it cooperates with an upright channel 72 located on the housing 44 to properly align the serrations 50 on the locking clip 48 with the serrations 52 on the longitudinal member 40, and two, it includes indicia on the face 70a of the tab 70 which when displayed indicates that the locking clip 48 is not fully engaged with the longitudinal member 40.

As illustrated in FIG. 3, the longitudinal member 40 includes a small aperture 74 through which the strand 32 extends and a socket 76 terminating at a post member 78. The spring 46 fits within the socket 76 and is positioned over the post 78. The longitudinal member also includes rib members 80, 82, having different widths, extending along the sides of the longitudinal member 40. As illustrated in FIG. 2, the rib member 80 includes a lock projection 84 at one end thereof and terminates prior to the end of the longitudinal member 40.

As illustrated in FIGS. 4 and 5, the passageway 42 in housing 44 includes an aperture 85 through which the strand 32 extends. A post member 87 is positioned at the end of the passageway 42 and receives the spring 46. The passageway 42 further includes channels 86, 88 sized to receive the rib members 80, 82. It should be appreciated that widths of the respective channels 86, 88 are different and correspond with the different widths of the rib members 80, 82 to ensure proper orientation of the longitudinal member 40 in the housing 44.

Terminating the rib members 80, 82 prior to the end of the longitudinal member 40, allows for removing the locking clip 48 from the housing 44. The locking clip 44 may be removed by fully depressing the longitudinal member 40 within the housing 44. After which the first set of resilient fingers 60 are urged inward, enabling the outwardly projecting locking projections 62 to clear the retainer bar 68 enabling the locking clip 48 to be withdrawn from the slot 49. Once the locking clip 48 is withdrawn, the longitudinal member 40 and corresponding spring 46 may be removed from the housing 44.

Referring to FIGS. 6 and 7, the strand end fitting 20 of the present invention is illustrated in a disengaged position. As illustrated, the complementary serrations 50, 52 on the clip 48 and longitudinal member 40 are disengaged enabling the spring 46 to outwardly bias the longitudinal member 40 and correspondingly apply a tensile force to the strand 32. As illustrated in FIG. 7, it should be appreciated that the rib members 80, 82 urge the first set of resilient fingers 60 outward causing the outwardly projecting locking projections 62 to engage the retainer bar 68.

Referring to FIGS. 8 and 9, the strand end fitting 20 of the present invention is illustrated in an engaged position. As illustrated, the planar surfaces 56 of the tooth members 54 forming the complementary serrations 50, 52 are engaged. It should be appreciated that the corresponding planar surfaces 56 bear the load when the strand 32 is pulled in the direction indicated by the arrow 90. As illustrated in FIG. 9, the locking clip 48 is secured in the engaged position by the outwardly deformable second set of resilient fingers 64. The inwardly projecting locking projections 66 of the resilient fingers 64 cooperate with the retainer bar 68 to secure locking clip 48 in the engaged position. The locking clip 48 is disengaged by depressing the ends 65 of the second set of resilient fingers 64 opposite the inwardly projecting locking projections 66.

Referring to FIGS. 2 and 4, in operation, the housing 44 is attached to the mounting pin 22 on the mounting member 24. The attachment portion 92 of the housing 44 forms a U-shaped slot 93. When the U-shaped slot 93 is placed adjacent to the mounting pin 22 and moved longitudinally the mounting portion 94 of the mounting pin 22 is received in the space 96. As the attachment portion 92 continues to move longitudinally the pin portion 98 moves along the slot 93 and deflects the projections 102 and is moved past the projections 102 to seat the mounting portion 94 at the end of the space 96.

Figure 11:
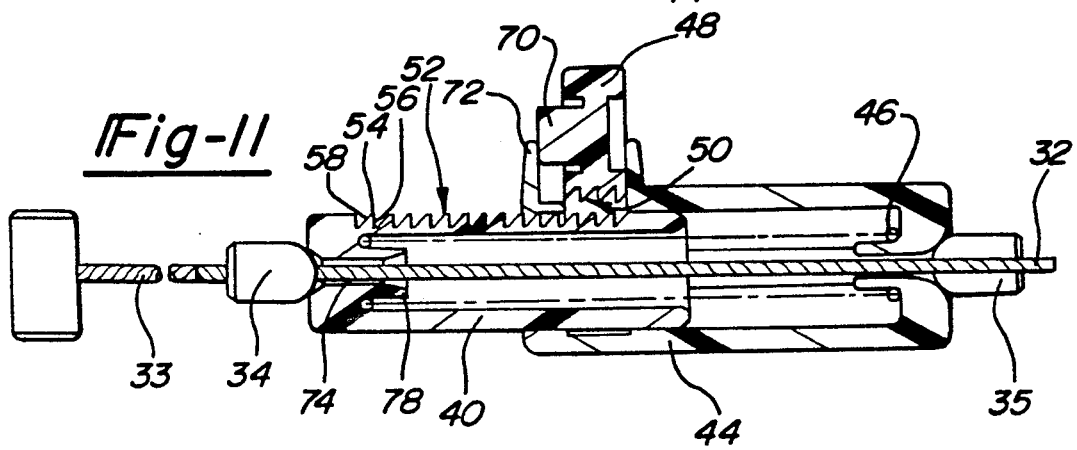
FIG. 11 is a view similar to FIG. 6 of a second alternative embodiment of the adjustable cable strand end fitting of FIGS. 1 and 2.
Figure 12:
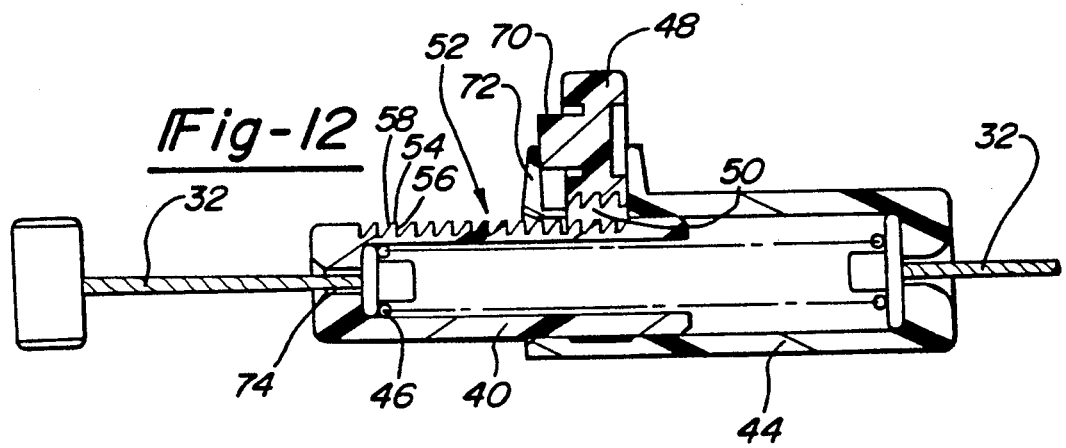
FIG. 12 is a view similar to FIG. 6 of a third alternative embodiment of the adjustable cable strand end fitting of FIGS. 1 and 2.
Figure 13:
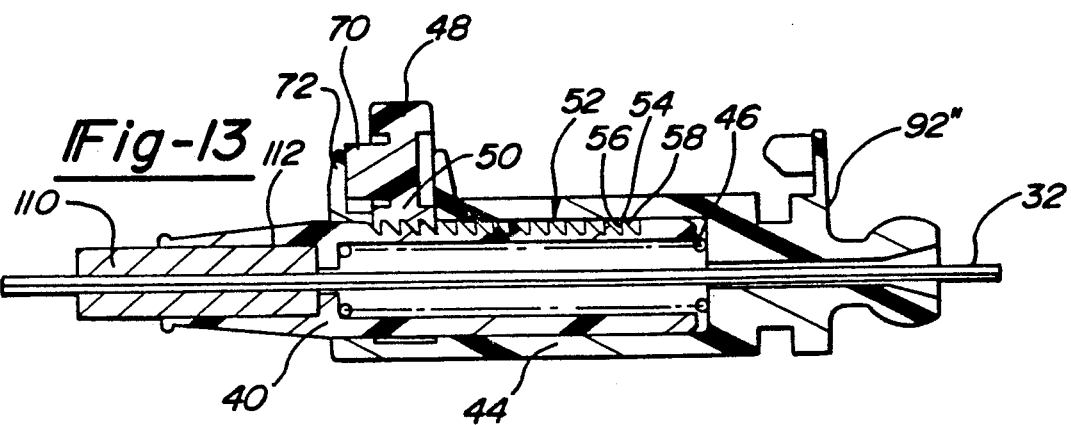
FIG. 13 is a view similar to FIG. 6 of a fourth alternative embodiment adjustable cable strand end fitting of FIGS. 1 and 2.
Figure 14:
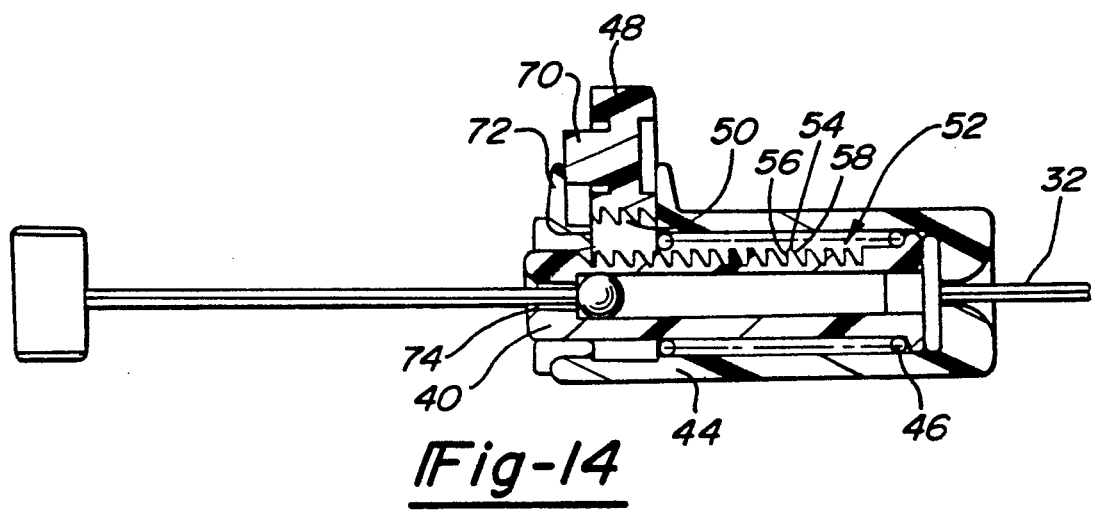
FIG. 14 is a view similar to FIG. 6 of a fifth alternative embodiment of the adjustable cable strand end fitting of FIGS. 1 and 2.

FIGS. 10 through 14 illustrate alternative embodiments of the present invention, FIG. 10 illustrates a cable strand end fitting having an utilizing an alternative attachment portion 92', to maintain continuity like parts have a like number which a prime superscript, the alternative embodiment shown in FIG. 10 may be secured to a mounting member (now shown) by inserting the attachment portion 92' into an aperture on the mounting member. While the attachment member 192 shown discloses a snap-fit mounting method, a twist-lock, i.e., the attachment member 92' is inserted into the aperture and then rotated such that locking projections in the attachment member 92' engage the mounting member, may also be used to secure the cable strand end fitting 20 to a mounting member. FIG. 11 illustrates a cable strand end fitting without a housing connection. The cable strand end fitting connects the ends of two separate cables 32, 33 positioned in a side by side relationship having retainer members 34, 35 staked to the end thereof. It should be appreciated that the tension in the strands is adjusted or controlled by the spring 46 positioned between the housing 44 and the longitudinal member 40. It should be appreciated that the strands overlap when the connector is compressed. FIG. 12 illustrates a cable strand end fitting with a manual adjustment for adjusting the tension in a cable strand 32. Compressing the longitudinal member 40 into the housing 44 increases the tension in the cable strand 32. The adjustment is achieved by manually compressing the longitudinal member. FIG. 13 illustrates a cable strand end fitting using the present invention to adjust the conduit. The strand end fitting includes an alternative attachment portion 92" for use in securing the strand end fitting to a mounting member. The disclosed alternative embodiment utilizes a twist-lock connector as set forth above to secure the strand end fitting to the mounting member. Other connector designs may also be used. FIG. 14 illustrates a cable strand end fitting similar to that illustrated in FIG. 11 for adjusting the tension in a strand without the use of overlapping or side by side strands. It should be appreciated that the strand end fitting also operates as a lost motion link to allow selective control of a mounting member, i.e. throttle valve of a vehicle engine between an accelerator pedal and a speed control system.

The present invention has been described in an illustrative manner. It is to be understood that the terminology which has been used is intended to be in the nature of words or description rather than of imitation.

Many modifications and variations are possible in light of the above disclosure. Therefore, within the scope of the attached claims, the present invention may be practiced otherwise than as specifically described.

What is claimed is:

1. A cable strand end fitting operative to cooperate with a retaining member staked to an end of a cable strand comprising:

a housing having a passageway, said housing having an attachment portion for attachment to a mounting pin located on a moveable member;

a longitudinal member telescopingly disposed within said passageway, said longitudinal member having an aperture therethrough for receiving a cable strand wherein the cable strand extends through said housing and said longitudinal member;

bias means acting between said housing and said longitudinal member for urging said longitudinal member against said retaining member;

locking means for preventing relative movement between said longitudinal member and said housing, said locking means operable to move between a first, disengaged position and a second, engaged position;

detent means for retaining the locking means in the engaged positions;

said housing having a slot transverse said passageway;

said longitudinal member including a plurality of serrations located on a surface thereof;

said locking means including a locking clip having a plurality of serrations complementary to the serrations on said longitudinal member positioned in said slot and operable to move between a first, disengaged position and a second, engaged position wherein when said locking clip is placed in the second, engaged position the plurality of said complementary serrations on said locking clip engage the plurality of serrations on said longitudinal member and retain said member in a fixed position;

said passageway is substantially cylindrical, and includes a plurality of channels located therein; and said longitudinal member including a plurality of rib members, said rib members slidably positioned within said channels when said longitudinal member is disposed in said passageway; and a first set of deflectable resilient fingers including locking projections thereon that coact with said rib members to retain the locking clip in the transverse slot.

2. An adjustable cable strand coupling comprising:

a support member having first and second ends, said support member having a socket formed therein which communicates with said first end of said support member and a passageway extending through said support member between said socket and said second end wherein said passageway is of a diameter less than that of said socket, said support member further having a slot transverse said socket, and including an attachment portion for attachment to a mounting pin located on a movable member;

a longitudinal member slidably disposed within said socket, and having an aperture extending therethrough for receiving a cable strand, said cable strand extending through said longitudinal member and having a retainer member fastened to the strand adjacent the end of said longitudinal member protruding from said support member; said longitudinal member further including rib members thereon, said rib members adapted to be received by a plurality of channels in said support member, said longitudinal member further including a plurality of serrations formed of individual tooth members each tooth member including a bearing surface and a ratchet surface;

bias means disposed within said socket and acting between said support member and said longitudinal member for moving said longitudinal member with respect to said support member; and a locking clip having a plurality of serrations formed of individual tooth members, each tooth member including a bearing surface and a ratchet surface complementary to the bearing surface and ratchet surface located on said longitudinal member, said locking clip positioned in said slot and operable to move between a first, disengaged position and a second engaged position wherein when said locking clip is in said second, engaged position, the tooth members of said locking clip coact the tooth members of said longitudinal member to prevent relative movement between said longitudinal member and said support member, said locking clip further including a tab cooperating with a channel on said support member to ensure proper orientation of the locking clip within said slot.

3. A cable strand end fitting as set forth in claim 2 wherein said attachment portion includes a U-shaped slot.

4. A cable strand end fitting as set forth in claim 3 wherein said U-shape slot includes inwardly projecting resilient portions adjacent the open end of said slot to retain said fitting on said mounting pin.

5. A cable strand end fitting as set forth in claim 2 wherein said bias means includes a spring positioned within said support member.

6. An adjustable cable strand coupling comprising:
a support member having a passageway formed therein and communicating with one end of said support member, said support member further having a slot transverse said passageway, and including an attachment portion for attachment to a mounting pin located on a moveable member;

a longitudinal member slidably disposed within said passageway, and having an aperture extending therethrough for receiving a cable strand, said cable strand extending through said longitudinal member and having a retainer member fastened to the strand adjacent the end of said longitudinal member protruding from said support member; said longitudinal member further including rib members thereon, said rib members adapted to be received by a plurality of channels in said support member, said longitudinal member further including a plurality of serrations formed of individual tooth members each tooth member including a bearing surface and a ratchet surface;

bias means for moving said longitudinal member with respect to said support member; and a locking clip having a plurality of serrations formed of individual tooth members, each tooth member including a bearing surface and a ratchet surface complementary to the bearing surface and ratchet surface located on said longitudinal member, said locking clip positioned in said slot and operable to move between a first, disengaged position and a second engaged position wherein when said locking clip is in said second, engaged position, the tooth members of said locking clip coact the tooth members of said longitudinal member to prevent relative movement between said longitudinal member and said support member, said locking clip further including a tab cooperating with a channel on said support member to ensure proper orientation of the locking clip within said slot; and said locking clip includes a first set of inwardly deflectable resilient fingers having locking projection thereon and a second set of deflectable resilient fingers having locking projections thereon.

7. A cable strand coupling comprising:
a housing having a passageway, said housing having an attachment portion for attachment to a mounting pin located on a moveable member;

a longitudinal member telescopingly disposed within said passageway, said longitudinal member having an aperture therethrough for receiving a cable strand wherein the cable strand extends through said housing and said longitudinal member;

bias means for moving said longitudinal member with respect to said housing;

locking means for preventing relative movement between said longitudinal member and said housing, said locking means operable to move between a first, disengaged position and a second, engaged position;

detent means for retaining the locking means in the engaged positions;

said housing having a slot transverse said passageway;

said longitudinal member includes a plurality of serrations located on a surface thereof;

said locking means includes a locking clip having a plurality of serrations complementary to the serrations on said longitudinal member positioned in said slot and operable to move between a first, disengaged position and a second, engaged position wherein when said locking clip is placed in the second, engaged position the plurality of said complementary serrations on said locking clip engage the plurality of serrations on said longitudinal member and retain said member in a fixed position;

said passageway is substantially cylindrical, and includes a plurality of channels located therein; and said longitudinal member including a plurality of rib members, said rib members slidably positioned within said channels when said longitudinal member is disposed in said passageway;

a first set of deflectable resilient fingers including locking projections thereon coact with said rib members to retain the locking clip in the transverse slot.

* * * * *